Dec. 1, 1931.  G. A. SUCKFIELD  1,834,437
CAR CONSTRUCTION
Filed July 1, 1930
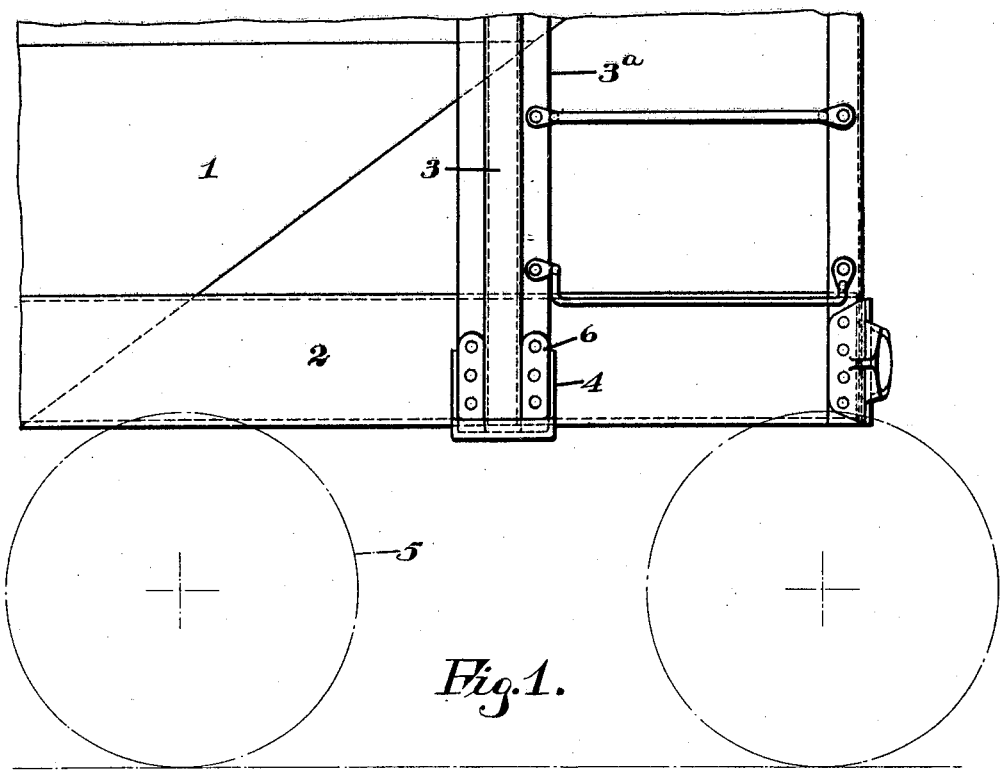
Fig.1.
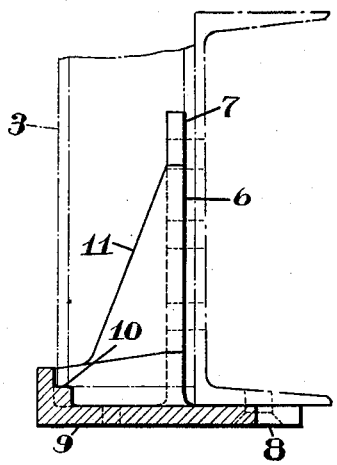
Fig.3.
Fig.4.
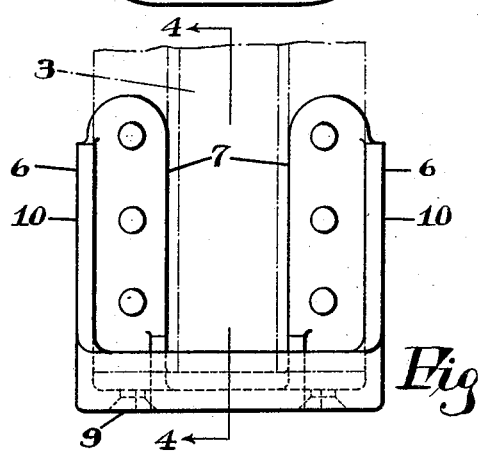
Fig.2.
INVENTOR
George A. Suckfield,
BY
ATTORNEY Patented Dec. 1, 1931

1,834,437

UNITED STATES PATENT OFFICE

GEORGE A. SUCKFIELD, OF AVALON, PENNSYLVANIA, ASSIGNOR TO PRESSED STEEL CAR COMPANY, OF PITTSBURGH, PENNSYLVANIA, A CORPORATION OF NEW JERSEY

CAR CONSTRUCTION

Application filed July 1, 1930. Serial No. 465,136.

My invention relates to car construction and has for an object the provision of a suitable casting, beneath which to place a car jack when necessary, which is readily accessible, of adequate strength and is suitably braced to support the weight of the car.

Another object of my invention is to provide such a jacking casting which will support the weight of the car under full load and which will so distribute the load back into the car structure to prevent undue distortion of the car body.

If, during the operation of the car, it becomes involved in an accident and one or more portions of the car truck are damaged, the repairs made are frequently emergency repairs and must be done without removing the lading from the car. In order to make these necessary repairs it is necessary to remove the weight of the car from the car trucks and a jack is ordinarily used for this purpose, placing the same under a portion of the car underframe.

Since the truck bolster ordinarily extends transversely of the car to a point adjacent the sides of the underframe it is often difficult to obtain a suitable bearing for the jack upon the side sill of the car and due to the car body often being fully loaded, unless the operator uses discretion in placing the jack beneath the body, the car body is often distorted while being raised. It is the principal object of my invention, therefore, to provide a suitable casting which may be engaged by the jack and will not cause distortion of the body when the body is raised.

Referring now to the drawings, Fig. 1 is a view showing a portion of the side of a car embodying my invention; Fig. 2 is an enlarged view showing the jacking casting in elevation; Fig. 3 is a plan view of Fig. 2; Fig. 4 is a section taken along the lines 4—4 of Fig. 2.

Referring now in detail to the drawings, reference character 1 indicates a car body having the usual side sills 2, side stake 3 and body bolster 4. The body bolster is not illustrated in the drawings but is in the usual position, above the truck as indicated by the wheels 5, and is located in this instance behind the side stake 3.

The jacking casting comprises the car engaging portions 7 and 8 which are adapted to be secured to the side sill 2 and in this case the portion 7 is also adapted to be secured to the side stakes 3. The portion 8 which is secured to the flange of the channel forming the side sill 2 has an integral portion 9 projecting outwardly from the plane of the side of the car and forms a bearing for the car jack. Above the jack bearing portion 9 and adjacent the outer edge thereof is a portion 10 which provides a suitable bearing for the outer portion of the side stake 3. Extending from the car engaging portions 7 to the jack bearing portions 9 are flanges or ribs 11 which serve to brace the jack bearing portion 9.

Referring to Figs. 1 and 4 of the drawings it will be seen that in assembling the jacking casting to the car body the portion 8 is secured to the lower flange of the side sill 2 and the portions 7 fit over the flanges 3ª of the side stake and have suitable openings through which fastening members may be placed to engage the portion 7, side stake 3 and side sill 2. As illustrated in Fig. 2 of the drawings the outer end of the side stake has a bearing on the portion 10 of the jacking casting and serves to further brace the casting.

Since the side of the car is constructed on the principle of a truss it will sustain the load within the car provided the weight is properly distributed through the members forming the truss construction of the side. It will be readily apparent, therefore, that when a jack is applied to the bearing surface 9 and the car body is elevated at that point, the portions 7 and 8 distribute the weight up into the side sill 2. The portion 10 above the jack bearing portion 9, through its engagement with the outer portion of the car stake 3, serves to distribute the weight directly into the side stake and car sides, as well as to reinforce the jack bearing surface 9.

It is obvious, therefore, that by the use of a jacking casting constructed as above described the car body can be elevated above the trucks at any time regardless of the car being loaded or empty, without distorting the car side or car side sill. It is also readily apparent that since the jack bearing portion 9 extends outwardly beyond the plane of the side of the car a suitable bearing, which is readily accessible, has been provided and which is adequately braced to support the weight of the car body and contained load.

Having thus described my invention what I claim as new and desire to secure by Letters Patent is:

1. In a railway car in combination, a side stake, a side sill and a jacking casting, said jacking casting being secured to said sill and stake, a portion of said casting being spaced outwardly from the plane of said sill and being reinforced by a bearing against a portion of said stake.

2. In a jacking casting for a railway car comprising, a jack bearing portion, car engaging portions for securing the casting to said car and an additional bearing for said car on said jack bearing portion being spaced outwardly from the plane of the side of said car.

3. In a railway car in combination, a side sill, a side stake and a jacking casting, said jacking casting embracing angularly disposed portions of said sill and stake.

GEORGE A. SUCKFIELD.